United States Patent [19]

Helm

[11] Patent Number: 5,641,170
[45] Date of Patent: Jun. 24, 1997

[54] PORTABLE TOOL CARRIER AND DISPLAY BOX

[76] Inventor: Paul E. Helm, 2028 Ridge Rd., Sellersville, Pa. 18960

[21] Appl. No.: 525,203

[22] Filed: Sep. 8, 1995

[51] Int. Cl.⁶ ........................................ B62B 1/04
[52] U.S. Cl. .................... 280/30; 280/40; 280/655; 280/47.26
[58] Field of Search ....................... 280/30, 638, 639, 280/37, 40, 645, 651, 652, 655, 655.1, 659, 47.18, 47.19, 47.24, 47.26, 47.315; 312/270.1, 270.2, 270.3, 272; 248/129; 206/377, 378

[56] References Cited

U.S. PATENT DOCUMENTS

| | | |
|---|---|---|
| 2,401,667 | 6/1946 | Segur . |
| 2,561,707 | 7/1951 | Miller . |
| 3,074,539 | 1/1963 | Rogovin . |
| 3,177,000 | 4/1965 | Alexander . |
| 3,865,392 | 2/1975 | Hartwag ................................. 280/40 |
| 4,006,821 | 2/1977 | Sautter . |
| 4,150,861 | 4/1979 | Dufrancatel . |
| 4,173,284 | 11/1979 | March . |
| 4,660,719 | 4/1987 | Peterson et al. . |
| 4,795,186 | 1/1989 | Tyus . |
| 5,013,055 | 5/1991 | Labrum ............................. 280/47.26 |
| 5,378,005 | 1/1995 | Norton .............................. 280/47.26 |
| 5,524,915 | 6/1996 | Liu ........................................ 280/30 |
| 5,553,692 | 9/1996 | Sheiman ............................. 280/655 |

*Primary Examiner*—Richard M. Camby
*Attorney, Agent, or Firm*—Synnestvedt & Lechner

[57] ABSTRACT

A portable tool carrier and tool display box is provided including a tool box and a telescoping handle secured to the tool box. A series of tool display boards are contained within the tool box with each board connected to the next adjacent board by means of a guide member and track. When the telescoping handle is elevated, the boards may be elevated with the first board connected to the top of the handle and each succeeding board beneath its preceding board.

11 Claims, 8 Drawing Sheets

5,641,170

PORTABLE TOOL CARRIER AND DISPLAY BOX

BACKGROUND OF THE INVENTION

1. Field of the Invention

The present invention relates to new and useful improvements in tool boxes wherein, after the tools are transported to the place of use, the tools may be elevated from a tool box on display boards for easy access by the user.

2. Description of the Prior Art

The conventional tool box used by most mechanics, electricians, carpenters, plumbers and technicians, etc. is a rigid box with one or more removable trays in which tools are placed, normally at random. When working on a job requiring the use of multiple tools, the user has to search through the tool box to find the desired tool. This can be frustrating and time consuming and extend the time to complete a particular project. Also, in situations where not only hand tools, but power tools or other large pieces of equipment and supplies are required, the worker must either use a separate hand cart or make several trips to the work site to have all the desired equipment at hand.

In view of the foregoing, it is an object of the present invention to provide a tool carrier and display box which can be easily transported and when open and set up will place all the tools within convenient view of the user.

Another object of the present invention is to provide a novel tool carrier and display box having a telescoping handle and folding wheels which, when both are extended, may be used as a hand cart and can have one or more containers of associated equipment attached thereto.

Still a further object of the present invention is to provide a tool box having a series of tool display boards which may be placed at different levels to display the available tools.

These and other objects of the present invention and the various features and details thereof will be apparent from the following description of the invention.

SUMMARY OF THE INVENTION

A portable tool carrier and display box for containing a plurality of tools includes a tool box and a telescoping handle for movement between a retracted and an extended position. A plurality of tool support boards are contained within the tool box with guide members on one tool support board in engagement with tracks on the next adjacent board. When the telescoping handle is extended, the tool support boards may be elevated, connected to the upper end of the handle with the boards displaying tools mounted on their face with one board immediately above the next adjacent board.

DETAILED DESCRIPTION OF THE INVENTION

Figure 1:
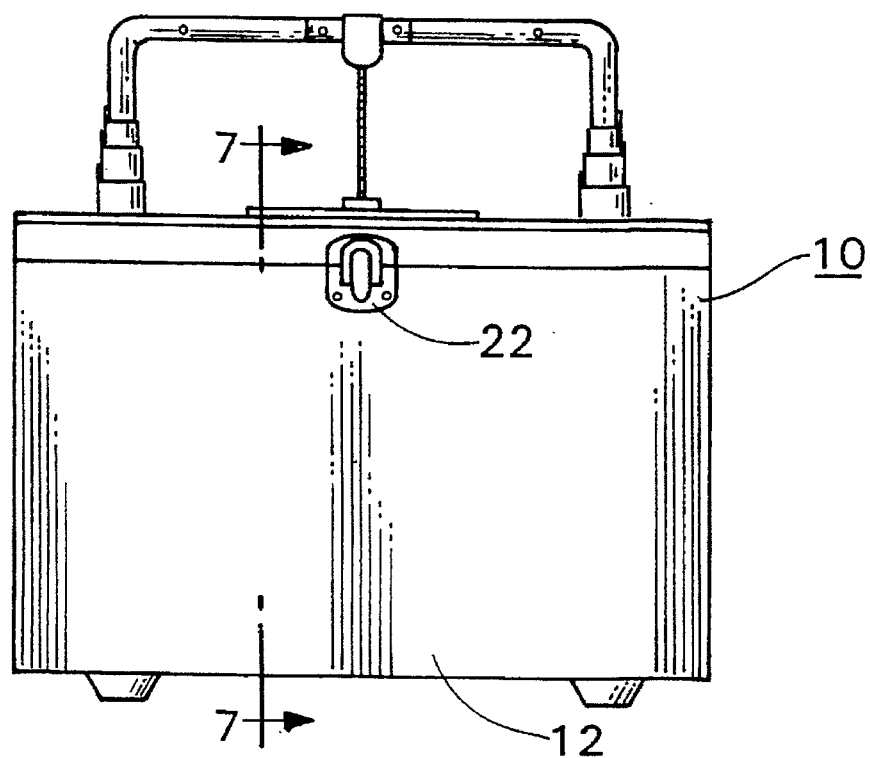
FIG. 1 is a front view of the tool carrier in a closed position.
Figure 2:
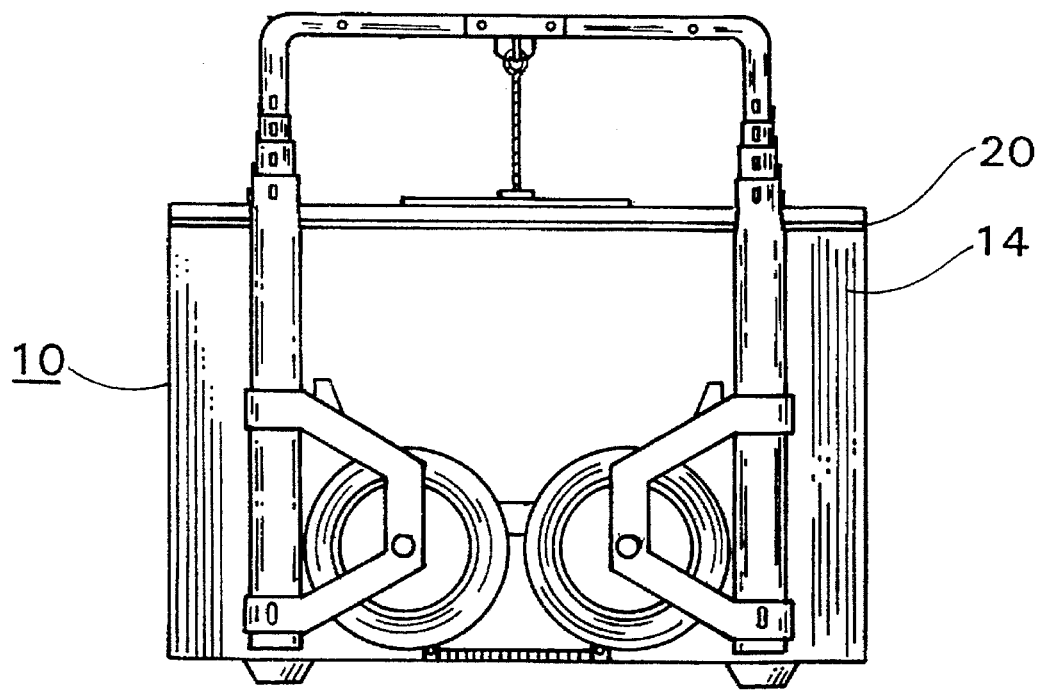
FIG. 2 is a rear view thereof.
Figure 3:
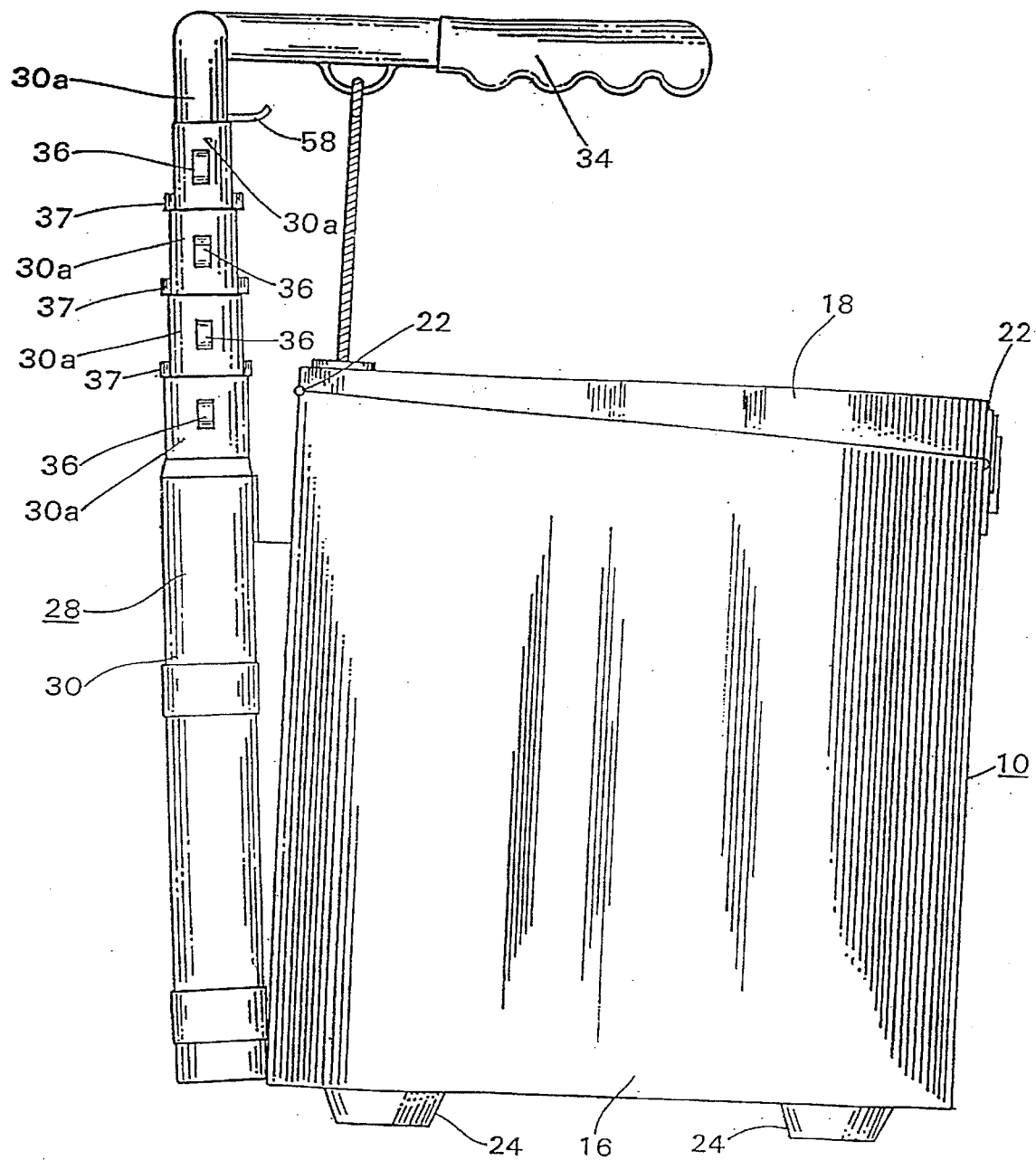
FIG. 3 is a side view of the tool carrier.
Figure 4:
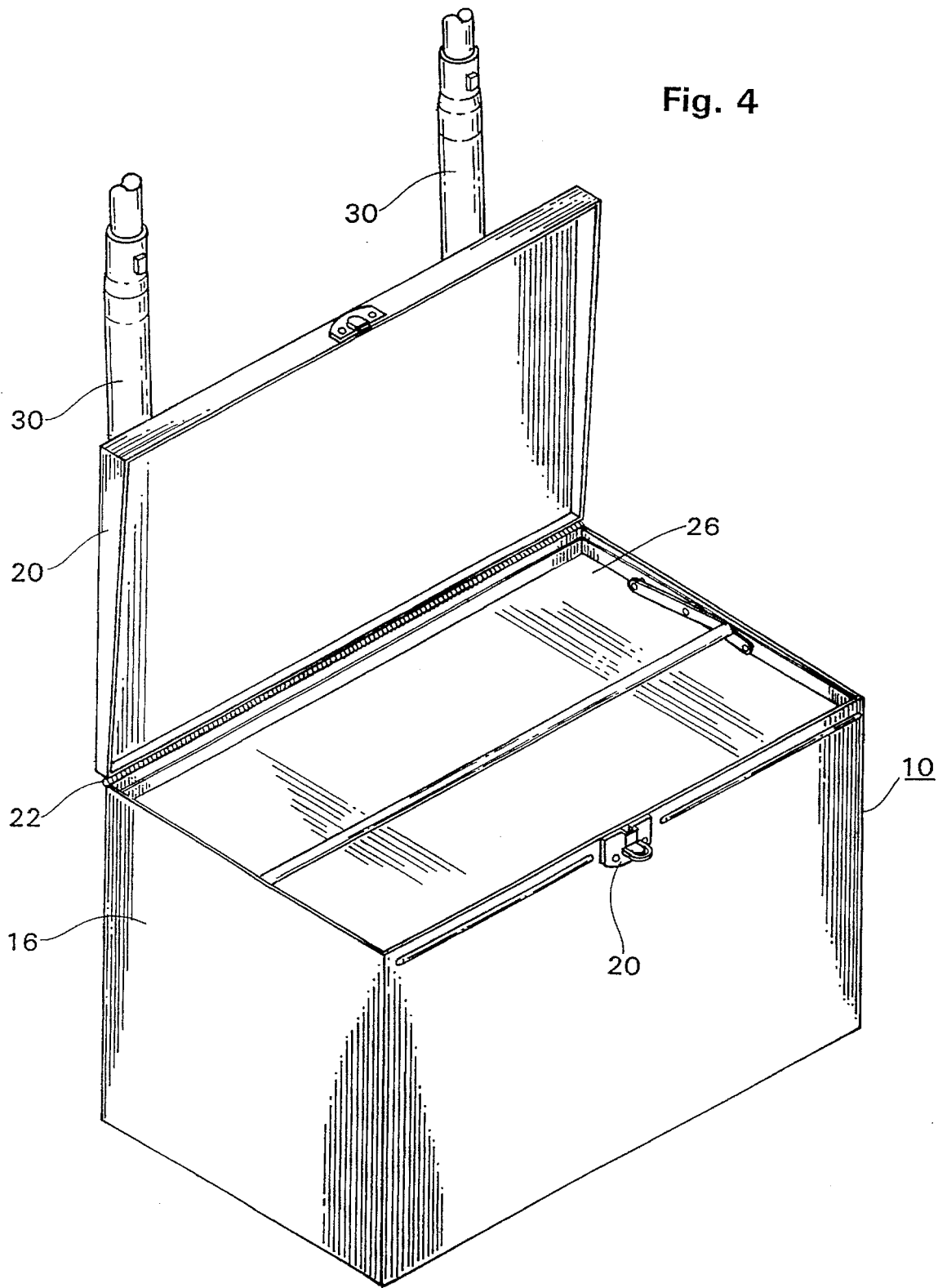
FIG. 4 is a perspective view of the tool carrier with the lid open.

Referring more specifically to the drawings, and particularly FIGS. 1 and 2, there is illustrated a tool carrier and display box made in accordance with the present invention. This comprises a rigid metal tool box 10 having a base, front and rear walls 12 and 14, respectively, and end walls 16. A lid 18 is secured to the upper edge of the rear wall 14, for example, by a piano hinge 20 and suitable catches 22 are provided to hold the lid in a closed position. In addition, relatively short feet 24 are provided on the tool box base. If desired, the tool box may have a removable upper tray 26 to carry loose articles.

Secured to the rear wall of the tool box 10 is an extendable handle member 28 which serves both as a transport handle for the tool box and as a tool display support, as more fully described hereafter. The handle member 28 includes a pair of spaced parallel telescoping legs 30, 30 secured to the tool box rear wall 14 adjacent each side edge thereof. The legs 30 are connected at their upper ends by a horizontal handle portion 32 which, when the legs are fully telescoped in their retracted position, as shown in FIG. 1 is slightly above the upper surface of the lid 18. A carrying handle 34 is connected to the mid-portion of the handle portion 32 and overlies the lid of the tool box for carrying the tool box when the legs 30 are retracted. Each leg 30 of the handle member 28 includes a plurality of telescoping segments 30a that can be locked in an extended or retracted position by conventional spring loaded detents 36. Rigid stop members 37 on intermediate leg segments 30a engage the upper surface of the segment into which it telescopes to limit the retracted position of the handle 28.

Figure 6:
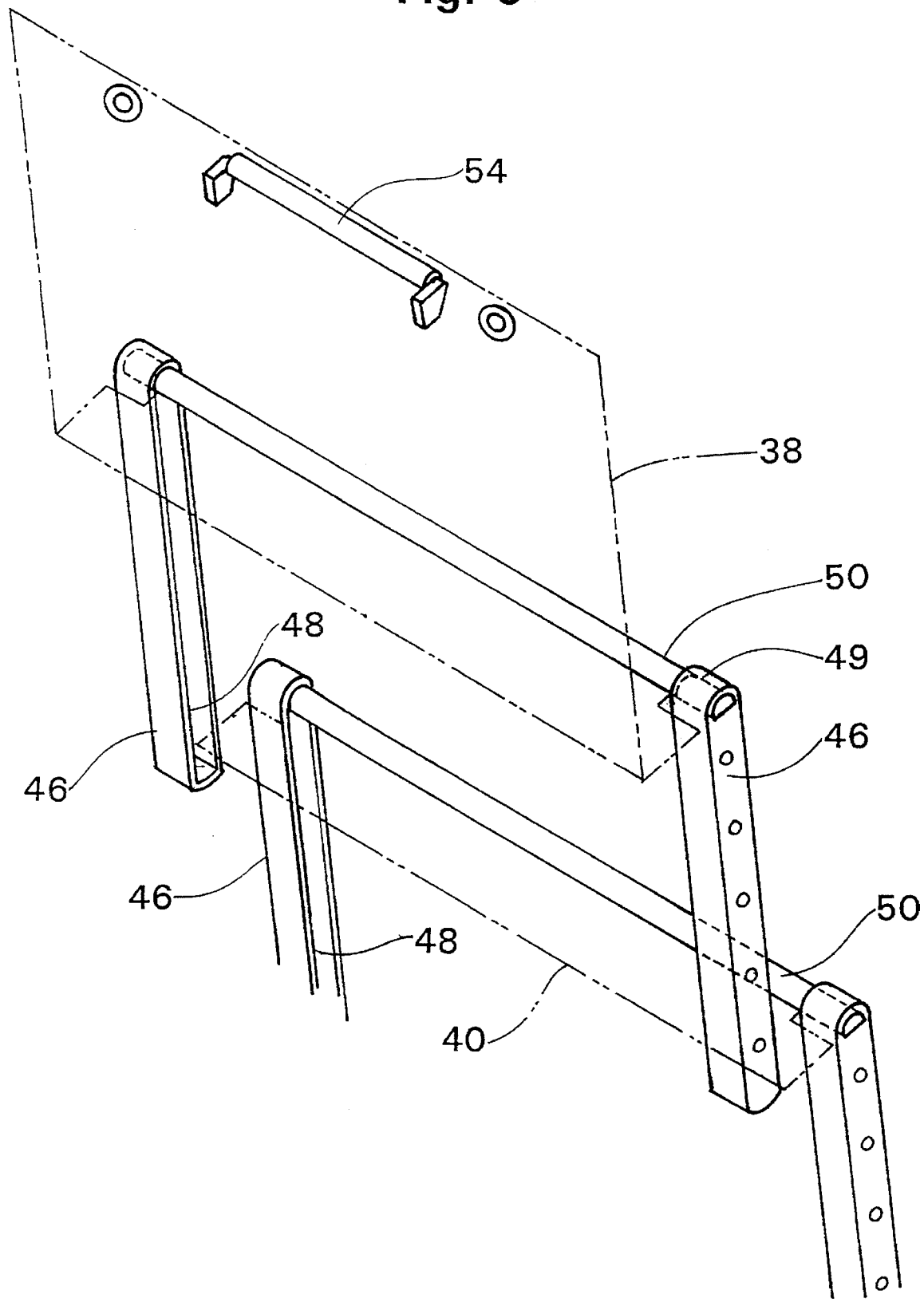
FIG. 6 is a fragmentary rear perspective view with the display boards in phantom lines illustrating the display board guide tracks.

Within the tool box 10, when closed, is a series of nested tool boards 38, 40, 42 and 44 each having a front face on which the desired tools may be mounted. As best shown in FIG. 6, the tool boards 40, 42 and 44, remote from the rear wall of the tool box, each have a pair of tracks 46, 46 adjacent each side edge forming facing grooves 48, 48 at the rear wall of the associated tool board. These tracks extend substantially the full height of the tool boards and are closed at their upper and lower ends by stop members 49. On the front face of each board 38, 40, and 42 facing the tracks 46 adjacent the lower opposite corners of the boards are forwardly extending guide arms 50, 50 with outwardly projecting end portions received within the track grooves 48.

Figure 5:
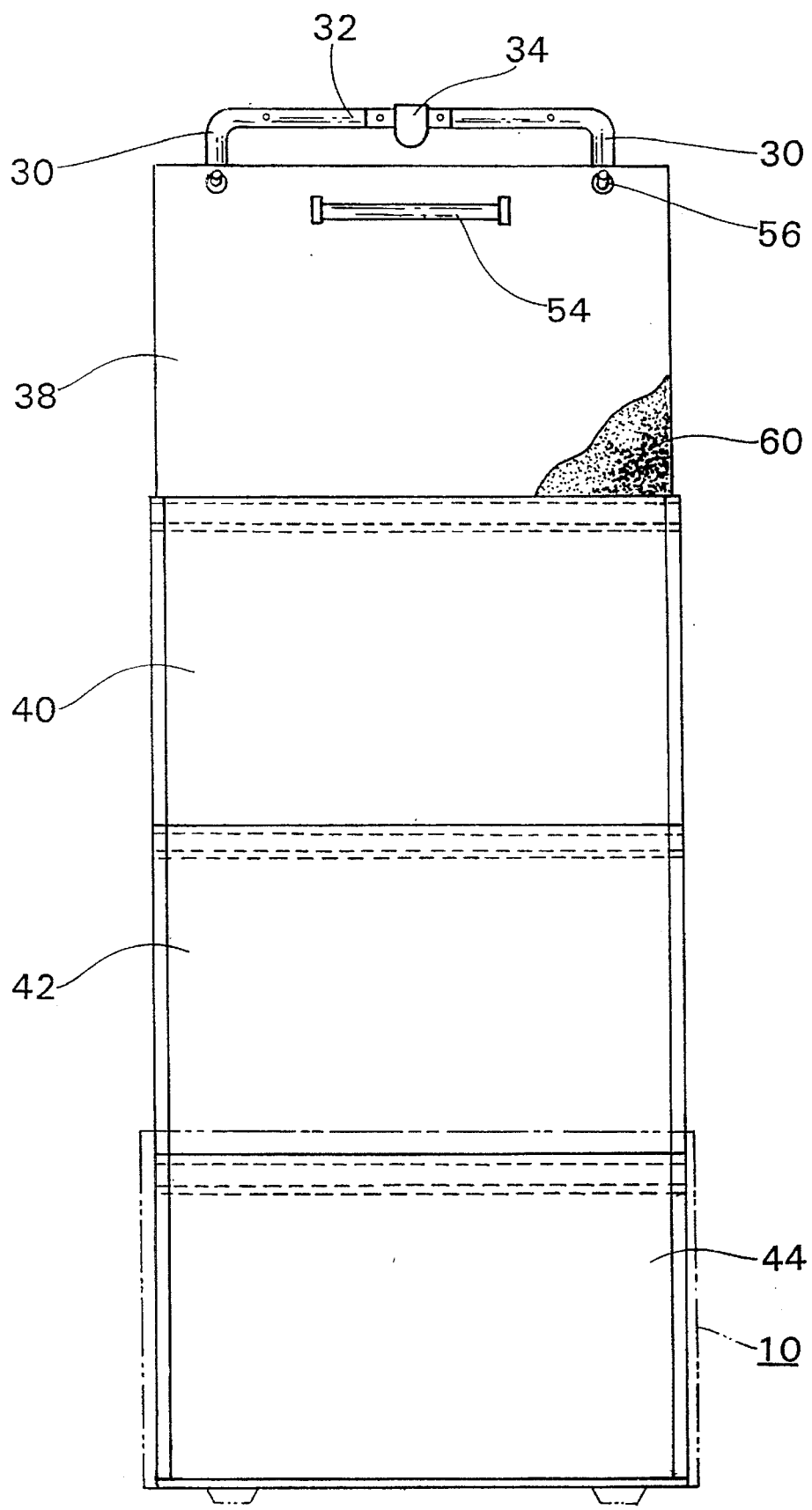
FIG. 5 is a front view of the tool carrier with the tool display boards fully extended.
Figure 7:
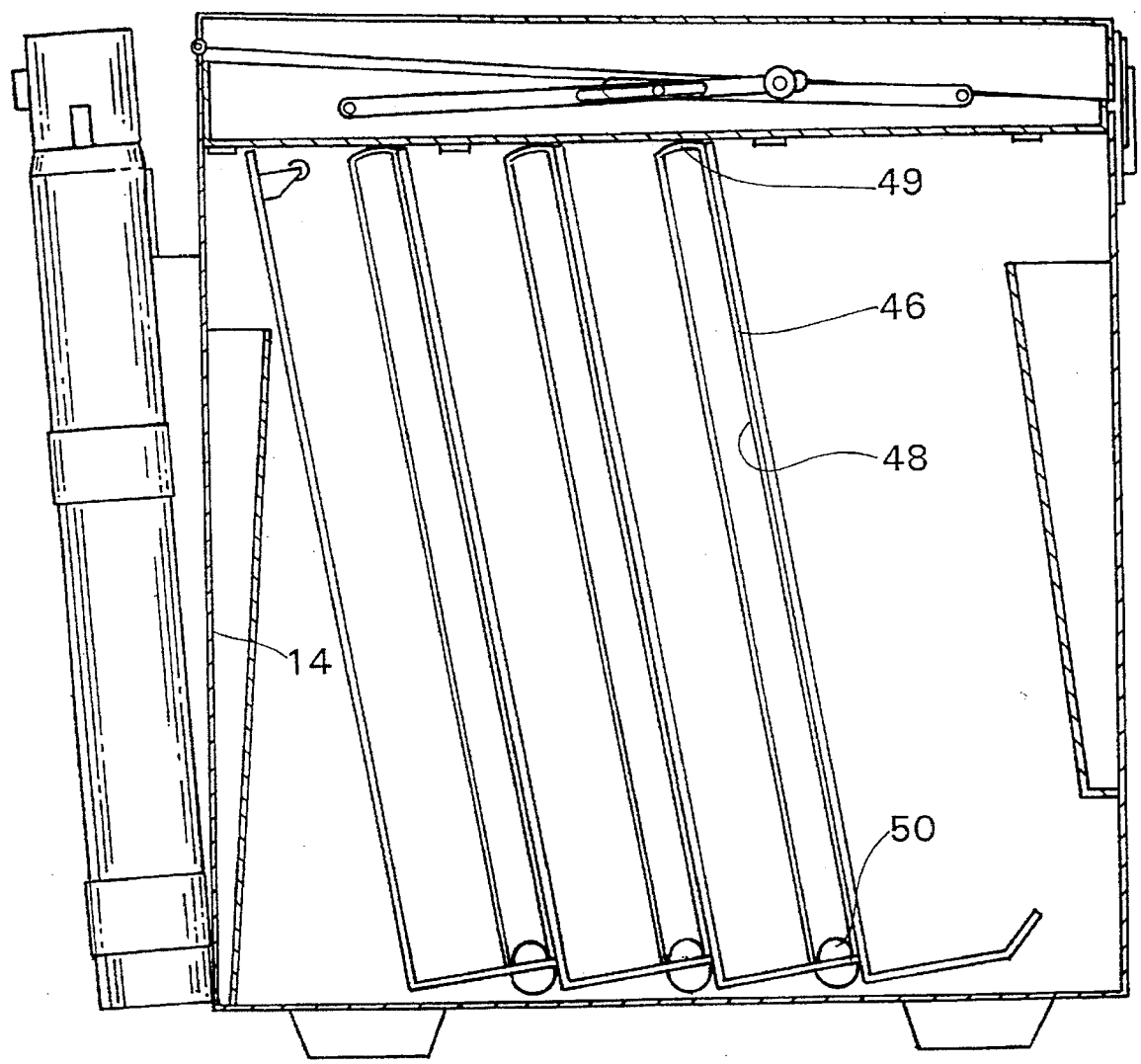
FIG. 7 is a transverse sectional view of the tool carrier taken on line 7—7, FIG. 1.
Figure 8:
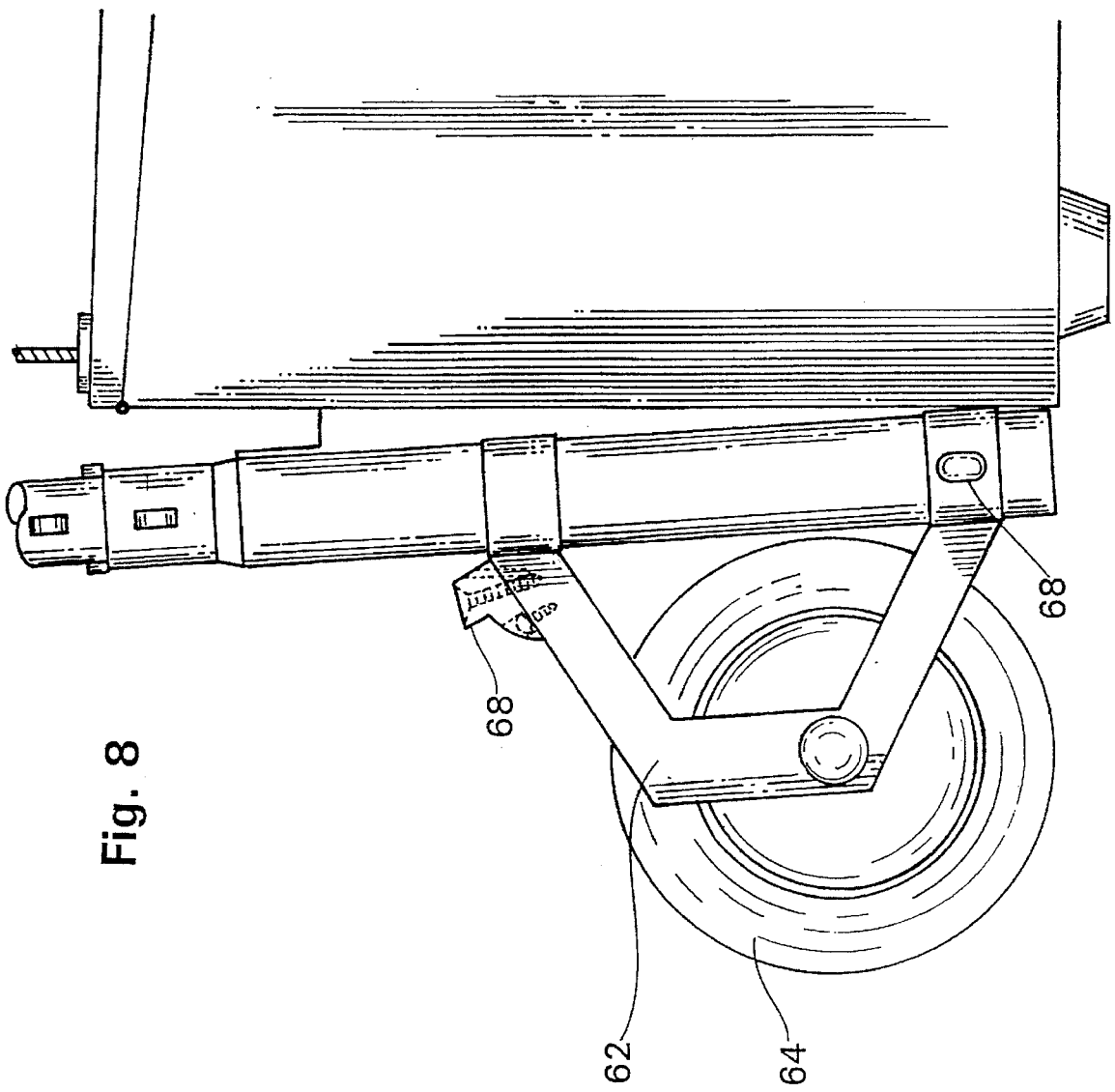
FIG. 8 is a fragmentary side view with the wheels back in an extended position.
Figure 9:
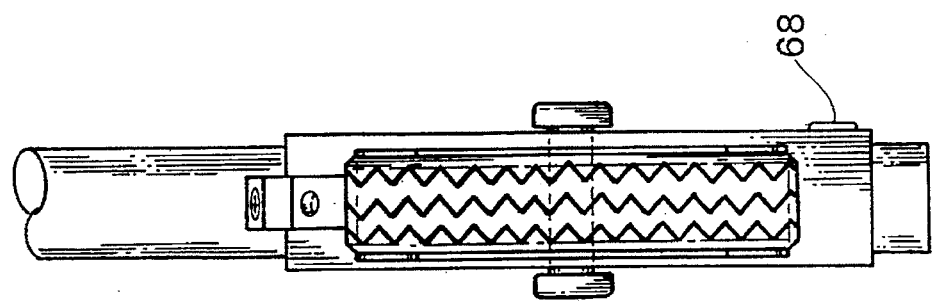
FIG. 9 is a face view of a wheel extended.
Figure 10:
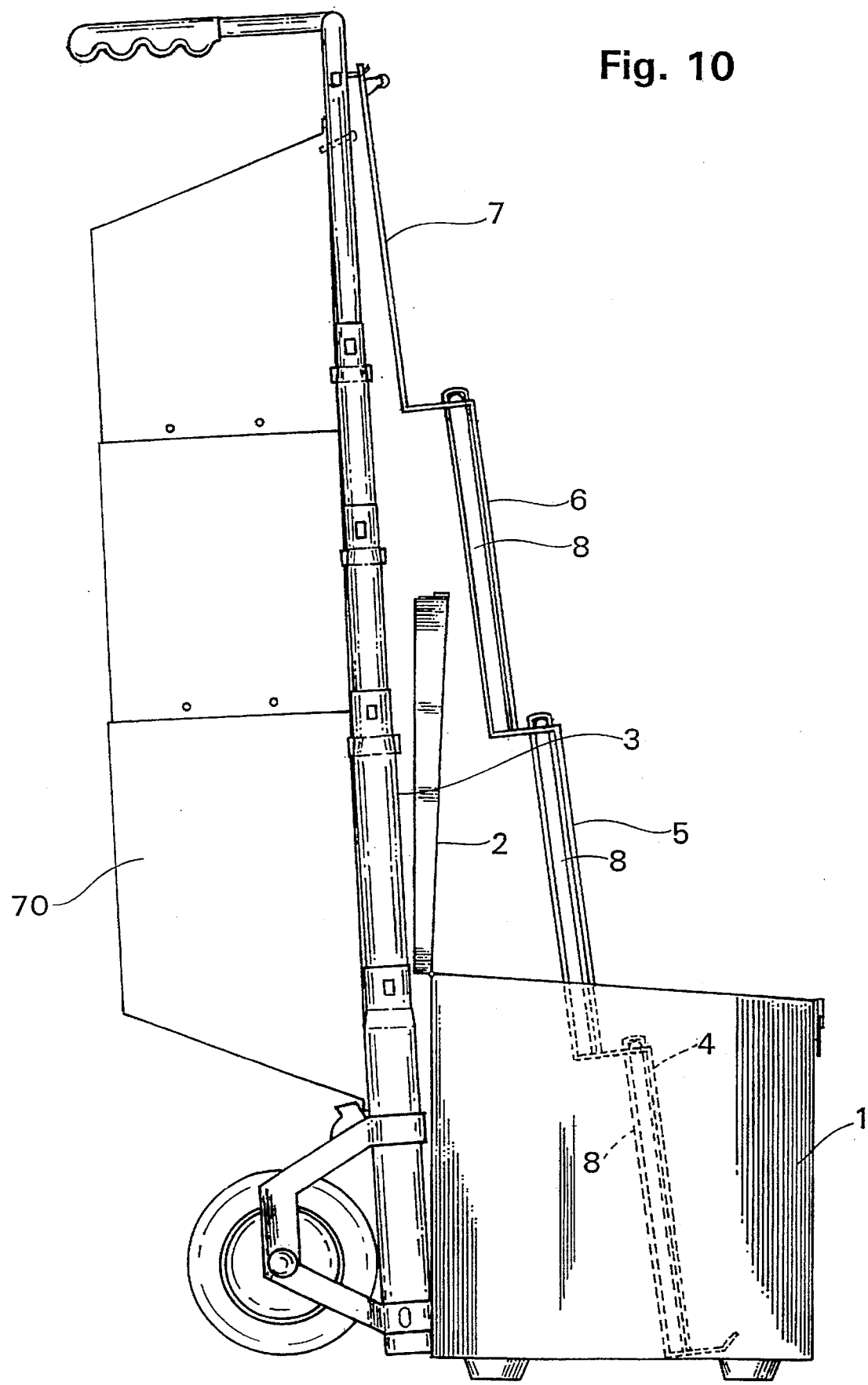
FIG. 10 is a side view of the tool carrier in its extended position.

To use the tool carrier and display box of the present invention, the tool box is first transported to the location of use. Thereafter, the lid 18 is opened and the handle 28 raised to its fully extended position, as shown in FIG. 5. The user of the tool box may then grasp a hand grip 54 on the upper center of the front surface of the rearmost tool support board 38 and raise it to the top of the handle 28. As the board 38 is elevated, the end portions 52 of the guide arms 50 engage the stops 49 at the top of each track 46 and pull each board upwardly to the position as shown in FIG. 5. The upper board may then be secured in its elevated position by securing eyelets 56 at the upper side edges of the board over a pair of board support pins 58 on the handle 28. After a job is completed, the hooks can be released from the support pins and the boards and tools returned to the tool box as shown in FIG. 7.

The required tools, depending on the needs of the user, are removably mounted to the front face of each board in any desired manner. For example, the front face of each board may be covered with a sheet of Velcro 60 and the tools held in position by Velcro fasteners. Alternatively, the boards may be peg board and the tools mounted on hooks, not shown.

To assist in transporting the tool box, a wheel bracket 62 is mounted at the bottom of each telescoping leg 30 at opposite sides of the tool box for pivotal movement about each leg from a retracted position flush with the rear wall of the tool box to an extended position as shown in FIG. 2. The brackets 62 each have wheels 64 pivotally mounted thereon. When the wheel brackets are extended, the entire unit may be tilted backward and transported as a hand cart. Spring biased detent members 66 maintain the wheel brackets in their extended and retracted positions.

Another feature of the present invention is the ability to transport accessory equipment when the tool carrier and display box is used as a hand cart. To this end projections 68 at the top of each wheel bracket 62 can engage and support one or more accessory carrier containers 70 which can be secured at their upper ends to the extended telescoping legs 30 in any conventional manner. With this arrangement, accessory equipment needed for a specific job can be transported along with an entire set of tools.

While a specific embodiment of the present invention has been illustrated and described herein, it is not intended to limit the invention to such a disclosure and changes and modifications may be incorporated and embodied therein within the scope of the following claims.

What is claimed is:

1. A portable tool carrier and display box for carrying and displaying a variety of tools comprising a tool box having a base and front, rear and side walls and a lid;

a telescoping handle secured to the rear wall of the tool box for movement between a retracted position and an extended position;

a plurality of tool support boards adapted to be carried within said tool box extending generally parallel to the rear wall thereof;

vertical tracks on the surface of each said tool support board except the board adjacent the tool box rear wall;

a stop at the upper end of each said track;

guide arms at the base of each said tool support board except the tool support board remote from the rear wall projecting toward and engaged within the tracks of the next adjacent tool support board to slide upwardly within the tracks into engagement with the stop member of said track; and connecting means to interconnect the upper end of the tool support board adjacent the rear wall of the tool box to the upper end of the extended handle to support the tool support boards in a depending relationship from the top of the extended handle.

2. A portable tool carrier and display box in accordance with claim 1 wherein said telescoping handle comprises a pair of spaced parallel telescoping rods secured to the rear of the tool box at opposite ends thereof; and means to lock said telescoping rods in their extended position.

3. A portable tool carrier and display box in accordance with claim 2 including a wheel bracket pivotally mounted on each telescoping rod and movable from a retracted position overlying the rear wall of the tool box to an extended position projecting away from the tool box; and a wheel mounted on each wheel bracket.

4. A portable tool carrier and display box in accordance with claim 3 including locking means to lock said wheel brackets in both their retracted and extended positions.

5. A portable tool carrier and tool box in accordance with claim 2 including a cross bar interconnecting the upper ends of the telescoping rods.

6. A portable tool carrier and tool box in accordance with claim 5 including a carrier handle mounted on said cross bar intermediate the telescoping rods adapted to overlie the lid of the tool box in the retracted position of the telescoping handle.

7. A portable tool carrier and display box in accordance with claim 6 including means to detachably secure said carrying handle to the lid of the tool box.

8. A portable tool carrier and display box in accordance with claim 1 including a lift handle on the tool support board adjacent the rear wall of the tool box to permit lifting of said tool support board from said tool box.

9. A portable tool carrier and display box in accordance with claim 3 including hook members projecting upwardly from said wheel brackets; and an accessory container adapted to engage said hook members and secure to said telescoping handle when said telescoping handle is in said extended position.

10. A portable tool carrier and display box in accordance with claim 1 wherein each said tool support board includes means on the face of the board facing said front wall to removably secure tools to said display board.

11. A portable tool carrier and display box in accordance with claim 10 wherein said means to secure tools to said tool support board comprises a sheet of Velcro adhered to the front face of each tool support board.

* * * * *